United States Patent
Matsusue

(10) Patent No.: US 11,469,432 B2
(45) Date of Patent: Oct. 11, 2022

(54) FUEL CELL SYSTEM

(71) Applicant: TOYOTA JIDOSHA KABUSHIKI KAISHA, Toyota (JP)

(72) Inventor: Masaaki Matsusue, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/220,473

(22) Filed: Apr. 1, 2021

(65) Prior Publication Data

US 2021/0313604 A1      Oct. 7, 2021

(30) Foreign Application Priority Data

Apr. 7, 2020   (JP) .............................. JP2020-069103

(51) Int. Cl.
*H01M 8/04*        (2016.01)
*H01M 8/04492*   (2016.01)
*H01M 8/0432*     (2016.01)

(52) U.S. Cl.
CPC ..... *H01M 8/04492* (2013.01); *H01M 8/0432* (2013.01)

(58) Field of Classification Search
CPC ........................ H01M 8/04492; H01M 8/0432
See application file for complete search history.

(56) References Cited

U.S. PATENT DOCUMENTS

2010/0239925 A1 * 9/2010 Ohkawara ................. C01B 3/48
                                                                        429/423

FOREIGN PATENT DOCUMENTS

JP         2012-156030 A       8/2012
JP         2017-147135 A       8/2017

* cited by examiner

*Primary Examiner* — Olatunji A Godo
(74) *Attorney, Agent, or Firm* — Finnegan, Henderson, Farabow, Garrett & Dunner, LLP

(57) ABSTRACT

To suppress the generation of condensed water and suppress the flow of the condensed water into a fuel cell stack. A fuel cell system comprising: a fuel cell stack, an elector set, a fuel gas supplier which supplies fuel gas to the ejector set, a circulation flow path, a mixed gas supply flow path, a temperature detector which detects a temperature of the fuel gas, and a controller, wherein the ejector set includes at least two ejectors in parallel, which are a first ejector that supplies first mixed gas to the fuel electrodes of the fuel cell stack, and a second ejector that supplies second mixed gas, in which a content ratio of the circulation gas is smaller than the first mixed gas, to the fuel electrodes of the fuel cell stack.

2 Claims, 2 Drawing Sheets

FUEL CELL SYSTEM

TECHNICAL FIELD

The disclosure relates to a fuel cell system.

BACKGROUND

A fuel cell is a power generation device that generates electrical energy by electrochemical reaction between hydrogen ($H_2$), which serves as fuel gas, and oxygen ($O_2$), which serves as oxidant gas, in a fuel cell stack (hereinafter, it may be simply referred to as "stack") composed of stacked unit fuel cells. Hereinafter, fuel gas and oxidant gas may be collectively and simply referred to as "reaction gas" or "gas".

In general, the unit fuel cells are composed of a membrane electrode assembly (MEA) and, as needed, two separators sandwiching the membrane electrode assembly.

The membrane electrode assembly has such a structure, that a catalyst layer and a gas diffusion layer are formed in this order on both surfaces of a solid polymer electrolyte membrane having proton ($H^+$) conductivity (hereinafter, it may be simply referred to as "electrolyte membrane").

In general, the separators have such a structure that a groove is formed as a reaction gas flow path on a surface in contact with the gas diffusion layer. The separators function as a collector of generated electricity.

In the fuel electrode (anode) of the fuel cell, the hydrogen supplied from the flow path and the gas diffusion layer is protonated by the catalytic activity of the catalyst layer, and the protonated hydrogen goes to the oxidant electrode (cathode) through the electrolyte membrane. An electron is generated at the same time, and it passes through an external circuit, do work, and then goes to the cathode. The oxygen supplied to the cathode reacts with the proton and electron on the cathode, thereby generating water.

The generated water provides the electrolyte membrane with appropriate moisture. Redundant water penetrates the gas diffusion layer, goes through the flow path and then is discharged to the outside of the system.

A technique for suppressing the supply of low-temperature fuel gas to a fuel cell and maintaining the power generation performance of the fuel cell at a satisfactory level, is under study.

For example, Patent Literature 1 discloses a method for controlling a fuel cell system configured to shut off, also for the purpose of tank protection, a main stop valve when the temperature of a tank falls below a predetermined threshold value.

Patent Literature 2 discloses a method for controlling fuel cell system configured to avoid malfunction at the time of low temperature, etc., of a valve in an injector provided in the fuel gas supply passage of the fuel cell system.

Patent Literature 1: Japanese Patent Application Laid-Open (JP-A) No. 2012-156030
Patent Literature 2: JP-A No. 2017-147135

For the fuel cell system disclosed in Patent Literature 1, when the threshold value of the tank temperature which is used to shut off the main stop valve, is low, it is difficult to prevent an increase in the amount of condensed water generated at the outlet port of the ejector of the system, at higher temperatures than the threshold value.

A possible method for increasing the temperature of fuel gas, is that the fuel gas temperature is increased by heat exchange between the fuel gas and cooling water as a heating medium, which circulates in and out of the fuel cell stack of the system to cool down the fuel cell stack. However, this method has the following problem: the fuel gas temperature cannot be sufficiently increased when the temperature of the cooling water is not sufficiently high.

Also, for example, when the fuel cell stack is operated in a high load condition to rapidly consume high-pressure fuel gas, fuel gas released from the fuel gas supplier of the system, such as a fuel tank, is cooled down by adiabatic expansion, and the temperature of the fuel gas is remarkably decreased. Then, the low-temperature fuel gas is supplied to the ejector and in the ejector, the supplied fuel gas joins circulation gas that contains moisture from the circulation flow path of the system. As a result, condensed water may be generated in the ejector and at the outlet port of the ejector, etc. When the condensed water enters the fuel cell stack, the power generation performance of the fuel cell stack may decrease.

SUMMARY

The disclosed embodiments were achieved in light of the above circumstances. A main object of the disclosed embodiments is to provide a fuel cell system configured to suppress the generation of condensed water and suppress the flow of the condensed water into the fuel cell stack of the system, even when the temperature of fuel gas supplied from the fuel gas supplier of the system is low.

In a first embodiment, there is provided a fuel cell system comprising:
a fuel cell stack,
an ejector set,
a fuel gas supplier which supplies fuel gas to the elector set,
a circulation flow path which recovers fuel off-gas discharged from the fuel cell stack and returns the fuel off-gas as circulation gas to the ejector set,
a mixed gas supply flow path which connects the ejector set with the fuel cell stack and enables supply of mixed gas containing the fuel gas and the circulation gas from the ejector set to fuel electrodes of the fuel cell stack,
a temperature detector which detects a temperature of the fuel gas, and
a controller,
wherein the ejector set includes at least two ejectors in parallel, which are a first ejector that supplies first mixed gas to the fuel electrodes of the fuel cell stack, and a second ejector that supplies second mixed gas, in which a content ratio of the circulation gas is smaller than the first mixed gas, to the fuel electrodes of the fuel cell stack, and
wherein, in the case where the fuel gas temperature detected by the temperature detector falls below a predetermined threshold value, the controller makes a usage ratio of the second ejector larger than a usage ratio of the first ejector when a total usage ratio of the ejectors of the ejector set is determined as 100%.

In the case where the fuel gas temperature detected by the temperature detector is the predetermined threshold value or more, the controller may make the usage ratio of the first ejector larger than the usage ratio of the second ejector when the total usage ratio of the ejectors of the ejector set is determined as 100%.

In the case where the fuel gas temperature detected by the temperature detector falls below the predetermined threshold value, the controller may switch from the first ejector to the second ejector and supply the second mixed gas from the second ejector to the fuel electrodes of the fuel cell stack.

In the case where the fuel gas temperature detected by the temperature detector is the predetermined threshold value or more, the controller may supply the first mixed gas from the first ejector to the fuel electrodes of the fuel cell stack.

The fuel cell system of the disclosed embodiments can suppress the generation of condensed water and suppress the flow of the condensed water into the fuel cell stack of the system. Accordingly, the fuel cell system can suppress a decrease in the power generation performance of the fuel cell stack.

BRIEF DESCRIPTION OF THE DRAWINGS

In the accompanying drawings.

DETAILED DESCRIPTION

The fuel cell system of the disclosed embodiments is a fuel cell system comprising:

a fuel cell stack, an ejector set, a fuel gas supplier which supplies fuel gas to the elector set, a circulation flow path which recovers fuel off-gas discharged from the fuel cell stack and returns the fuel off-gas as circulation gas to the ejector set, a mixed gas supply flow path which connects the ejector set with the fuel cell stack and enables supply of mixed gas containing the fuel gas and the circulation gas from the elector set to fuel electrodes of the fuel cell stack, a temperature detector which detects a temperature of the fuel gas, and a controller, wherein the ejector set includes at least two ejectors in parallel, which are a first ejector that supplies first mixed gas to the fuel electrodes of the fuel cell stack, and a second ejector that supplies second mixed gas, in which a content ratio of the circulation gas is smaller than the first mixed gas, to the fuel electrodes of the fuel cell stack, and wherein, in the case where the fuel gas temperature detected by the temperature detector falls below a predetermined threshold value, the controller makes a usage ratio of the second ejector larger than a usage ratio of the first ejector when a total usage ratio of the ejectors of the ejector set is determined as 100%.

Figure 1:
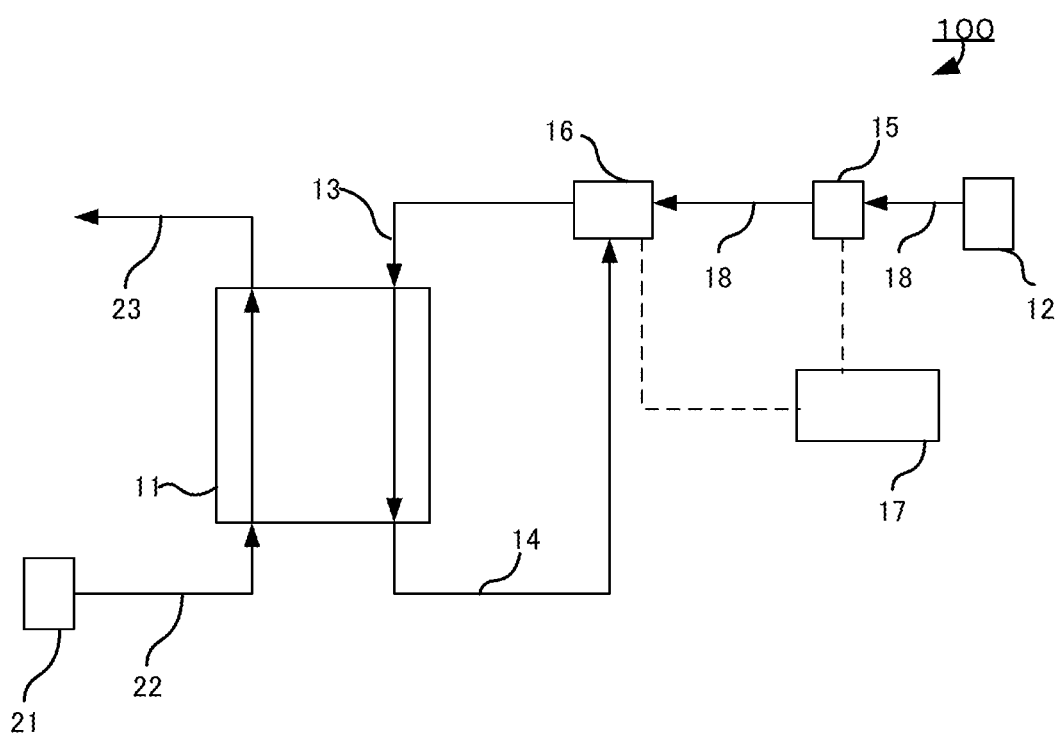
FIG. 1 is a view of an example of the structure of the fuel cell system according to the disclosed embodiments.

FIG. 1 is a view of an example of the structure of the fuel cell system according to the disclosed embodiments.

A fuel cell system 100 shown in FIG. 1 includes the following: a fuel cell stack 11; a fuel gas supplier 12; a mixed gas supply flow path 13; a circulation flow path 14 which circulates, as circulation gas, fuel off-gas discharged from the fuel electrodes of the fuel cell stack 11; a temperature detector 15 which detects the temperature of fuel gas; an ejector set 16 which supplies mixed gas of the fuel gas and the circulation gas to the fuel electrodes of the fuel cell stack 11; a controller 17; a fuel gas supply flow path 18; an oxidant gas supplier 21; an oxidant gas supply flow path 22; and an oxidant gas discharge flow path 23.

The fuel cell system of the disclosed embodiments includes at least the fuel cell stack, the fuel gas supplier, the mixed gas supply flow path, the circulation flow path, the temperature detector, the ejector set and the controller. In general, the fuel cell system further includes a fuel gas supply flow path, an oxidant gas supplier, an oxidant gas supply flow path, an oxidant gas discharge flow path, a cooling water supplier, a cooling water circulation flow path, etc.

The fuel cell stack is composed of stacked unit fuel cells.

The number of the stacked unit fuel cells is not particularly limited. For example, 2 to 200 unit fuel cells may be stacked.

The fuel cell stack may include an end plate at both stacking-direction ends of each unit fuel cell.

Each unit fuel cell includes at least a membrane electrode assembly including an oxidant electrode, an electrolyte membrane and a fuel electrode. As needed, it may include two separators sandwiching the membrane electrode assembly.

The separators may have such a gas flow path structure, that a groove is formed as a reaction gas flow path on a surface in contact with a gas diffusion layer. Also, the separators may have such a cooling water flow path structure, that a groove is formed on an opposite surface to the surface in contact with the gas diffusion layer, as a cooling water flow path for keeping the stack temperature at a constant level.

The separators may be a gas-impermeable, electroconductive member, etc. As the electroconductive member, examples include, but are not limited to, gas-impermeable dense carbon obtained by carbon densification, and a metal plate obtained by press molding. The separators may have a current collection function.

The oxidant electrode includes an oxidant electrode catalyst layer and a gas diffusion layer.

The fuel electrode includes a fuel electrode catalyst layer and a gas diffusion layer.

The oxidant electrode catalyst layer and the fuel electrode catalyst layer may contain a catalyst metal for accelerating an electrochemical reaction, a proton-conducting electrolyte, or electron-conducting carbon particles, for example.

As the catalyst metal, for example, platinum (Pt) or an alloy of Pt and another metal (such as Pt alloy mixed with cobalt, nickel or the like) may be used.

The electrolyte may be fluorine resin or the like. As the fluorine resin, for example, a Nafion solution may be used.

The catalyst metal is supported on carbon particles. In each catalyst layer, the carbon particles supporting the catalyst metal (i.e., catalyst particles) and the electrolyte may be mixed.

As the carbon particles for supporting the catalyst metal (i.e., supporting carbon particles), for example, water repellent carbon particles obtained by enhancing the water repellency of commercially-available carbon particles (carbon powder) by heating, may be used.

The gas diffusion layer may be a gas-permeable, electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a moisture-containing, thin perfluorosulfonic acid membrane. The electrolyte membrane may be a Nafion membrane (manufactured by DuPont), for example.

The fuel gas supplier supplies fuel gas to the ejector set.

The fuel gas is gas that mainly contains hydrogen. For example, it may be hydrogen gas.

As the fuel gas supplier, examples include, but are not limited to, a fuel tank such as a liquid hydrogen tank and a compressed hydrogen tank.

The fuel cell system may include the fuel gas supply flow path.

The fuel gas supply flow path connects the fuel gas supplier with the ejector set and enables the supply of the fuel gas from the fuel gas supplier to the ejector set. The fuel gas supply flow path is not always necessary when the fuel gas supplier and the ejector set are disposed adjacent to each other, and the fuel gas can be directly supplied from the fuel gas supplier to the ejector set.

The circulation flow path enables that it connects the fuel cell stack with the ejector set, recovers the fuel off-gas discharged from the fuel electrodes of the fuel cell stack, and returns the fuel off-gas as the circulation gas to the elector set.

The fuel off-gas mainly contains fuel gas, which passed through the fuel electrode while remaining unreacted, and moisture, which is water generated at the oxidant electrode and delivered to the fuel electrode.

The ejector set supplies the mixed gas containing the fuel gas and the circulation gas to the fuel electrodes of the fuel cell stack.

The ejector set includes at least two ejectors in parallel, which are the first ejector and the second ejector.

The first ejector supplies the first mixed gas to the fuel electrodes of the fuel cell stack.

The second ejector supplies the second mixed gas, in which the content ratio of the circulation gas is smaller than the first mixed gas, to the fuel electrodes of the fuel cell stack.

From the viewpoint of increasing fuel gas efficiency and suppressing a decrease in the power generation performance of the fuel cell stack, in addition to the first and second ejectors, the ejector set may include other ejectors. For example, the ejector set may include the first ejector, the second ejector and a third ejector in parallel, the third ejector serving to supply third mixed gas, in which the content ratio of the circulation gas is smaller than the second mixed gas, to the fuel electrodes of the fuel cell stack.

In the first mixed gas, the content ratio of the circulation gas may be 2 to 10 times larger than the second mixed gas, or it may be 3 to 4 times larger than the second mixed gas, for example.

The ejectors of the ejector set are electrically connected with the controller. The use of the ejectors in combination or the use of any one of the ejectors may be enabled by a signal from the controller.

The mixed gas supply flow path connects the ejector set with the fuel cell stack and enables the supply of the mixed gas containing the fuel gas and the circulation gas from the elector set to the fuel electrodes of the fuel cell stack.

The fuel cell system, may include a fuel off-gas discharger.

The fuel off-gas discharger enables the discharge of the fuel off-gas, in which the concentration of the fuel gas is the predetermined concentration or less, to the outside. The outside means the outside of the fuel cell system.

The fuel off-gas discharger may include a fuel off-gas discharge valve. As needed, it may further include a fuel off-gas discharge flow path.

The fuel off-gas discharge valve controls the fuel off-gas discharge flow amount.

The fuel off-gas discharge flow path may branch from the circulation flow path.

The fuel off-gas discharger may enable the discharge of the fuel off-gas to the outside when, for example, the concentration of the fuel gas such as hydrogen in the fuel off-gas is the predetermined concentration or less. The predetermined concentration of the fuel gas is not particularly limited and may be appropriately determined considering the fuel efficiency of the fuel cell system, for example.

The method for detecting the concentration of the fuel gas in the fuel off-gas is not particularly limited. For example, a conventionally-known concentration sensor may be used.

A gas-liquid separator for reducing the moisture in the fuel off-gas, may be installed in the circulation flow path. Also, a drain flow path, which branches from the circulation flow path by the gas-liquid separator, may be installed in the circulation flow path, and a drain valve may be installed in the drain flow path.

The moisture separated from the fuel off-gas in the gas-liquid separator may be discharged by opening the drain valve of the drain flow path branching from the circulation flow path.

The fuel off-gas subjected to the moisture separation may be suctioned from the circulation flow path by the ejector, while it is in the state of containing a slight amount of remaining mist.

The temperature detector detects the temperature of the fuel gas released from the fuel gas supplier.

As the temperature detector, examples include, but are not limited to, a temperature sensor.

The temperature detector may be a temperature sensor built into a fuel tank serving as the fuel gas supplier, for example.

The oxidant gas supplier supplies oxidant gas to at least the oxidant electrodes of the fuel cell stack.

As the oxidant gas supplier, for example, an air compressor may be used.

The oxidant gas supply flow path enables that it connects the oxidant gas supplier with the fuel cell stack and supplies oxidant gas from the oxidant gas supplier to the oxidant electrodes of the fuel cell stack.

The oxidant gas is oxygen-containing gas. It may be air, dry air, pure oxygen or the like.

The oxidant gas discharge flow path enables the discharge of the oxidant gas from the oxidant electrodes of the fuel cell stack.

The fuel cell system may include a cooling water supplier and a cooling water circulation flow path.

The cooling water circulation flow path enables that it communicates between the cooling water inlet port communication hole and cooling water outlet port communication hole installed in the fuel cell stack, circulates the cooling water supplied from the cooling water supplier in and out of the fuel cell stack, and cools down the fuel cell stack.

As the cooling water supplier, examples include, but are not limited to, a cooling water pump.

The controller controls the fuel cell system.

The controller may be connected with the temperature detector, the ejector set, the fuel gas supplier, the oxidant gas supplier and so on through an input-output interface.

The controller makes a judgement on whether or not the fuel gas temperature detected by the temperature detector falls below the predetermined threshold value. Also, the controller controls the usage ratio of the ejectors of the ejector set, etc.

The controller physically includes a processing unit such as a central processing unit (CPU), a memory device such as a read-only memory (ROM) and a random access memory (RAM), and the input-output interface, for example. The ROM is used to store a control program, control data and so on processed by the CPU, and the RAM is mainly used as various workspaces for control processes.

(1) Detection of the Fuel Gas Temperature

The temperature detector detects the temperature of the fuel gas supplied from the fuel gas supplier, at predetermined times.

The method for detecting the fuel gas temperature is not particularly limited. For example, the fuel gas temperature may be detected by installing a conventionally-known temperature sensor in the fuel cell system and using the temperature sensor.

As the temperature sensor, for example, a built-in temperature sensor of the fuel tank may be used.

The timing for detecting the fuel gas temperature is not particularly limited. The fuel gas temperature may be detected every time a predetermined time elapses after the operation of the fuel cell stack is started; it may be detected when the operation of the fuel cell stack is started; or it may be constantly detected. The detection time may be appropriately determined.

(2) Judgement on Whether or not the Fuel Gas Temperature Falls Below the Predetermined Threshold Value The controller judges whether or not the fuel gas temperature detected by the temperature detector falls below the predetermined threshold value.

The threshold value of the fuel gas temperature can be appropriately determined as follows, for example: data group showing a correlation between the fuel gas temperature and the power generation performance of the fuel cell stack, are prepared in advance by an experiment, etc., and the threshold value of the fuel gas temperature is appropriately determined by the performance, etc., of the fuel cell stack obtained from the data group.

(3) Control of the Usage Ratio of the Ejectors

The method for controlling the usage ratio of the ejectors is not particularly limited. The usage ratio may be controlled by electrically connecting the controller with the ejectors and delivering a signal from the controller to the ejectors.

The usage ratio of the ejectors can be appropriately determined as follows, for example: data group showing a correlation between the power generation performance of the fuel cell stack and the usage ratio of the ejectors, are prepared in advance by an experiment, etc., and the usage ratio of the ejectors is appropriately determined from the data group.

(3-1) The Case where the Fuel Gas Temperature Falls Below the Predetermined Threshold Value In the case where the fuel gas temperature detected by the temperature detector falls below the predetermined threshold value, the controller makes the usage ratio of the second ejector larger than the usage ratio of the first ejector when the total usage ratio of the ejectors of the ejector set is determined as 100%, and then the controller terminates the control. Accordingly, even when the temperature of the fuel gas released from the fuel gas supplier is low, the ratio of moisture-containing circulation gas, which is contained in the mixed gas supplied to the fuel electrodes of the fuel cell stack, can be decreased. Accordingly, for example, the generation of condensed water at the outlet port of the ejector set can be suppressed. Then, the amount of condensed water flowing into the fuel cell stack can be decreased, and a decrease in the power generation performance of the fuel cell stack can be suppressed.

The usage ratio of the ejectors of the ejector set in the case where the fuel gas temperature falls below the predetermined threshold value, is not particularly limited, as long as the usage ratio of the second ejector is larger than the usage ratio of the first ejector when the total usage ratio of the ejectors is determined as 100%. From the viewpoint of further suppressing a decrease in the power generation performance of the fuel cell stack, the usage ratio of the second ejector may be 100%. In other words, in the case where the fuel gas temperature detected by the temperature detector falls below the predetermined threshold value, the controller may switch from the first elector to the second ejector and supply the second mixed gas from the second elector to the fuel electrodes of the fuel cell stack.

(3-2) The Case where the Fuel Gas Temperature is the Predetermined Threshold Value or More On the other hand, in the case where the fuel gas temperature detected by the temperature detector is the predetermined threshold value or more, the controller makes the usage ratio of the first ejector larger than the usage ratio of the second ejector when the total usage ratio of the electors of the ejector set is determined as 100%, and then the controller terminates the control. At the time of starting the operation of the fuel cell stack and during the normal operation of the fuel cell stack, from the viewpoint of increasing the fuel efficiency, the controller makes the usage ratio of the first ejector larger than the usage ratio of the second ejector when the total usage ratio of the ejectors of the ejector set is determined as 100%. Accordingly, in the case where the fuel gas temperature is the predetermined threshold value or more, and in the case where the usage ratio of the first ejector is larger than the usage ratio of the second ejector when the total usage ratio of the ejectors of the ejector set is determined as 100%, the controller may terminate the control.

In the case where the fuel gas temperature is the predetermined threshold value or more, even if the moisture-containing circulation gas contained in the mixed gas supplied to the fuel electrodes of the fuel cell stack, is increased, condensed water is less likely to flow into the fuel cell stack. Accordingly, the circulation efficiency of the circulation gas is increased, and the fuel efficiency is increased.

The usage ratio of the ejectors of the ejector set in the case where the fuel gas temperature is the predetermined threshold value or more, is not particularly limited, as long as the usage ratio of the first ejector is larger than the usage ratio of the second ejector when the total usage ratio of the ejectors is determined as 100%. From the viewpoint of further increasing the fuel efficiency of the fuel cell stack, the usage ratio of the first ejector may be 100%. In other words, in the case where the fuel gas temperature detected by the temperature detector is the predetermined threshold value or more, the controller may switch from the second ejector to the first ejector and supply the first mixed gas from the first ejector to the fuel electrodes of the fuel cell stack.

Figure 2:
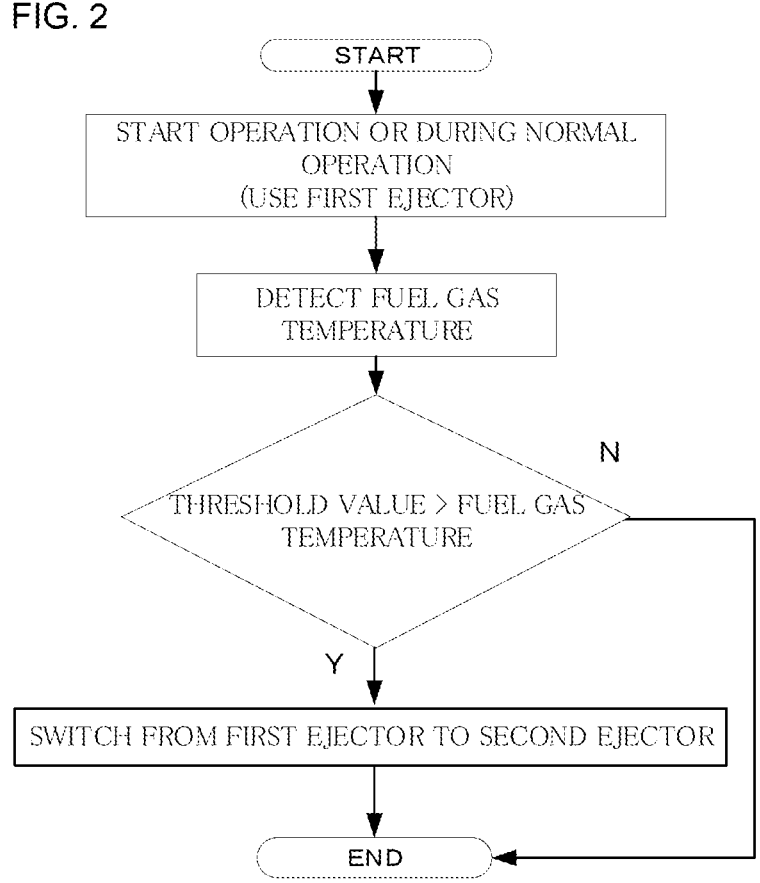
FIG. 2 is a flow chart of an example of the method for controlling the fuel cell system according to the disclosed embodiments.

FIG. 2 is a flow chart of an example of the method for controlling the fuel cell system according to the disclosed embodiments. The disclosed embodiments are not limited to this typical example.

In the control method shown in FIG. 2, first, at the time of starting the operation of the fuel cell stack or during the normal operation the fuel cell stack, the controller supplies the first mixed gas to the fuel electrodes of the fuel cell stack by using the first ejector.

Next, the temperature detector detects the fuel gas temperature.

Then, in the case where the detected fuel gas temperature is the predetermined threshold value or more, the controller terminates the control.

On the other hand, in the case where the detected fuel gas temperature falls below the threshold value, the controller switches from the first ejector to the second ejector and supplies the second mixed gas to the fuel electrodes of the fuel cell stack. Then, the controller terminates the control.

REFERENCE SIGNS LIST

11. Fuel cell stack
12. Fuel gas supplier
13. Mixed gas supply flow path
14. Circulation flow path
15. Temperature detector
16. Ejector set
17. Controller
18. Fuel gas supply flow path
21. Oxidant gas supplier
22. Oxidant gas supply flow path
23. Oxidant gas discharge flow path
100. Fuel cell system

The invention claimed is:

1. A fuel cell system comprising:
a fuel cell stack,
an ejector set,
a fuel gas supplier which supplies hydrogen fuel gas to the ejector set,
a circulation flow path which recovers fuel off-gas discharged from the fuel cell stack and returns the fuel off-gas as circulation gas to the ejector set,
a mixed gas supply flow path which connects the ejector set with the fuel cell stack and enables supply of mixed gas containing the fuel gas and the circulation gas from the ejector set to fuel electrodes of the fuel cell stack,
a temperature detector which detects a temperature of the fuel gas, and
a controller,
wherein the ejector set includes at least two ejectors in parallel, which are a first ejector that supplies first mixed gas to the fuel electrodes of the fuel cell stack, and a second ejector that supplies second mixed gas, in which a content ratio of the circulation gas is smaller than the first mixed gas, to the fuel electrodes of the fuel cell stack,
wherein, the controller is programmed to make a usage ratio of the second ejector larger than a usage ratio of the first ejector when the fuel gas temperature detected by the temperature detector falls below a predetermined threshold value and when a total usage ratio of the ejectors of the ejector set is determined as 100%, and
wherein, the controller is programmed to make the usage ratio of the first ejector larger than the usage ratio of the second ejector when the fuel gas temperature detected by the temperature detector is the predetermined threshold value or more and when the total usage ratio of the ejectors of the ejector set is determined as 100%.

2. The fuel cell system according to claim 1, wherein, the controller is programmed to switch from the first ejector to the second ejector when the fuel gas temperature detected by the temperature detector falls below the predetermined threshold value and to supply the second mixed gas from the second ejector to the fuel electrodes of the fuel cell stack, and
wherein, the controller is programmed to supply the first mixed gas from the first ejector to the fuel electrodes of the fuel cell stack when the fuel gas temperature detected by the temperature detector is the predetermined threshold value or more.

* * * * *